Patented Aug. 28, 1923.

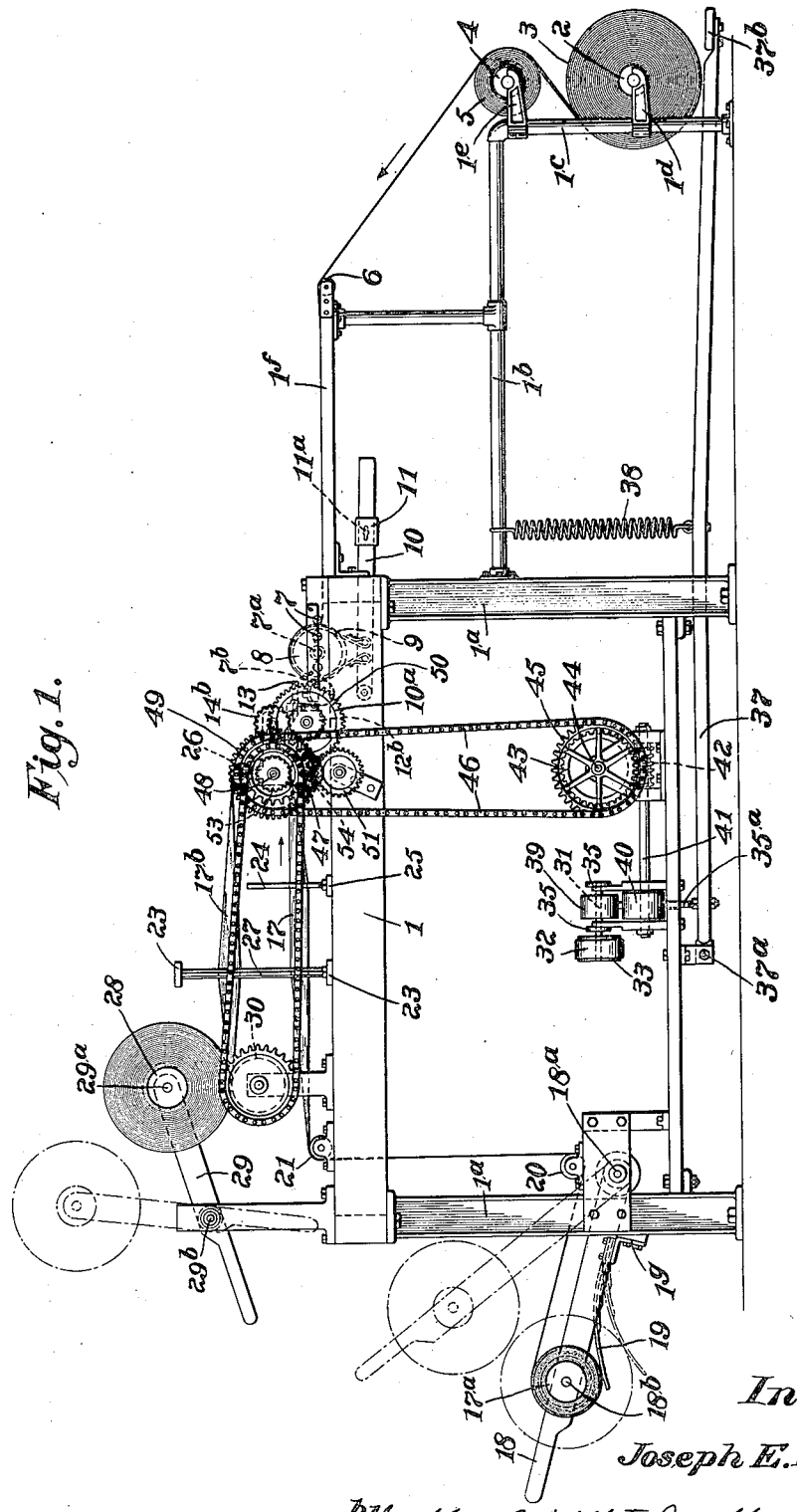

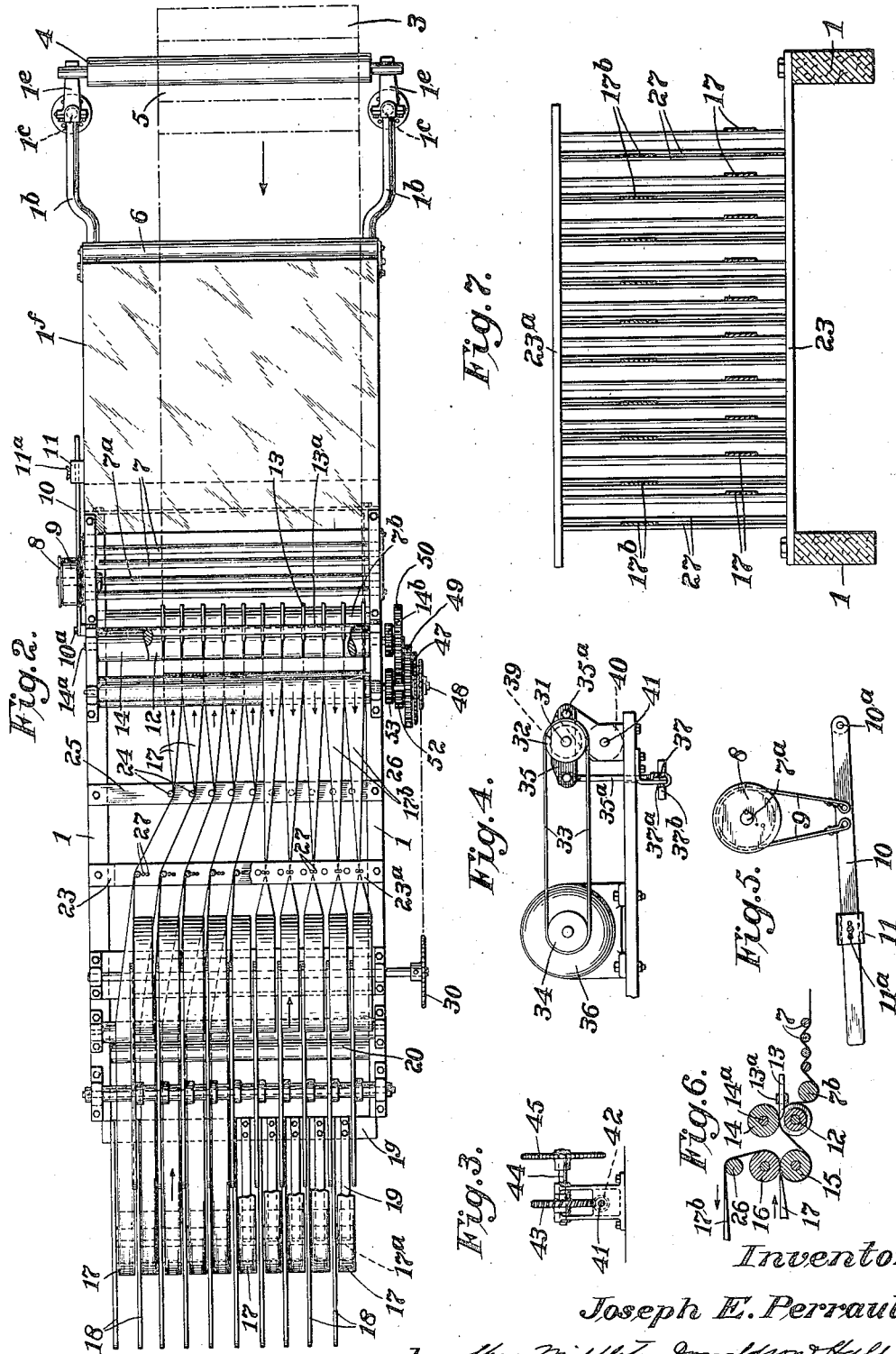

1,466,101

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

BIAS-FLAP STOCK CUTTING AND APPLYING MACHINE.

Application filed July 21, 1922. Serial No. 576,529.

*To all whom it may concern:*

Be it known that I, JOSEPH E. PERRAULT, a citizen of the United States, and a resident of Watertown, in the county of Middlesex and State of Massachusetts, have invented certain new and useful Improvements in Bias-Flap Stock Cutting and Applying Machines, of which the following is a specification.

My present invention relates to a machine designed to cut a travelling sheet of fabric into strips or ribbons and juxtapose and attach the same to other strips or ribbons and thereafter spool the combination of ribbons.

The invention is particularly designed to sever into a plurality of strips or ribbons the bias cut stock which is used as an outer covering for the flaps or liners of pneumatic tires, and to apply said covering strips or ribbons to the previously assembled laminated strips designed to form the body portion of the flaps or liners. In other words, the invention is specifically designed to form and apply bias friction fabric strips or ribbons to the laminated ribbons which are produced by the invention which forms the subject matter of an application filed June 26, 1922, Serial No. 570,813.

The invention has among its objects to provide a simple, economical, durable and efficient machine which will sever the bias cut fabric into strips or ribbons while being continuously fed from a supply roll or other source, and which will apply said strips to the surfaces of the laminated body forming strips referred to.

With these and other objects in view, the invention includes the novel features of construction and arrangement and combination of parts hereinafter described, the nature and scope of my invention being defined and determined by the claims appended hereto.

What I at present regard as the preferred embodiment of my invention is illustrated in the accompanying drawings, in which:

Fig. 1 is a side elevation of a machine constructed according to my invention.

Fig. 2 is a plan view.

Figs. 3 and 4 are detail views of the power drive.

Fig. 5 is a detail view of the tension brake, and

Fig. 6 is a longitudinal sectional view through the cutting apparatus and associated rolls, these, however, being of a somewhat conventional nature, and omitting all other machine parts for convenience of illustration.

Fig. 7 is an elevation showing the vertical guides.

Referring by reference characters to these drawings, the numeral 1 designates the horizontal frame or table portion of the machine supported upon suitable standards $1^a$ and having projecting from one end thereof a stock supporting frame which may conveniently consist of horizontal members $1^b$ and vertical members $1^c$. These latter carry brackets $1^d$ upon which the stock rolls 2 are rotatably and removably supported, whereby when all the stock has been withdrawn from a roll it may be readily replaced by a roll bearing a fresh supply of stock. The stock wound on the roll is indicated at 3. This stock, when designed for the particular use referred to, is in the nature of bias friction fabric, and due to the sticky nature of the unvulcanized rubber coating thereof is wound upon the stock roll with an interposed liner or sheet of material which will prevent the convolutions of the fabric upon the roll from adhering to each other. Standards $1^c$ carry other brackets $1^e$ upon which is rotatably and removably mounted a roll 4 which is designed to have the liner wound thereon as indicated at 5. In the starting of the unwinding process the end of the liner strip is attached to the roll 4 in any suitable manner and the friction fabric 3 carried up over the outer periphery of the roll and caused to travel in the direction of the arrow and thereafter rotates the roll 4 by frictional contact, causing the liner to be wound on the roll in the manner well understood by those skilled in the art. From the roll 4 the friction fabric is led over a guide roll 6 journaled at the outer extremity of a suitable supporting frame $1^f$ and thence is led over and under or in a zig-zag course around a plurality of rolls 7 which impart a certain amount of drag or frictional resistance to the passage of the sheet, and which also tend to straighten out any wrinkles therein or prevent the formation of any wrinkles. In order that the tension on the sheet as it passes to the cutting apparatus hereinafter described may be varied according to circumstances, such as the character of material operated upon, I provide one of the rolls $7^a$ with a shaft extension carrying a brake drum 8 around which passes a brake band 9, the ends of which are attached to a lever 10 fulcrumed at $10^a$ and provided with an adjustable weight 11 which may be slid along the lever and locked in any adjusted position by a locking wing screw $11^a$.

One of the rolls $7^b$ is preferably of larger diameter and so located that the stock passes therefrom in a preferably vertical path to the periphery of the lower roll of the cutting apparatus. Such cutting apparatus preferably comprises a lower steel roll 12 having a plurality of annular grooves into which project the slitting knives 13 supported by a cross bar $13^a$ and spaced apart the proper distance to slit the material into strips or ribbons of the width desired, and an upper presser roll 14 preferably in the shape of a rubber cylinder mounted on a carrying shaft $14^a$, these rolls being geared to rotate in unison by intermeshing gears $12^b$ and $14^b$ and being driven in the manner hereinafter described.

From the bight of the rolls 12 and 14 the slitted strips pass around the lower of a pair of coacting presser rolls 15 and 16 respectively, and by the action of these rolls the laminated ribbon are pressed against the faces of the bias strips or ribbons and caused to adhere thereto. Such body forming ribbons are indicated at 17. They are supplied from a plurality of spools or drums $17^a$ which are mounted on lever 18 fulcrumed at $18^a$ so as to be capable of being individually lifted up into the position shown in dotted lines in Fig. 1, whereby an empty spool may be readily removed and replaced by a fresh spool. The spools, which are preferably wooden spools or rolls, are removably journaled on pins $18^b$ projecting from the sides of the levers 18. A leaf spring 19 is positioned beneath each spool, being supported by having one end thereof suitably secured to a cross bar $1^g$ carried by the rear standards $1^a$, the spool resting upon the outer end portion of the spring. The spring is made of such relative strength that when a spool is full the spring will be deflected into the position shown in dotted lines in Fig. 1, and due to the increased weight of the full roll frictional contact will be greatest, at which time the leverage action of the unwinding stock is greatest. As the roll unwinds and decreases in weight the roll rises and the tension on the spring is relieved and the frictional action thereof is reduced.

From the spools $17^a$ the ribbons 17 pass under guide rolls 20 and thence up to and over guide rolls 21 and thence to the bight of rolls 15 and 16.

It is obvious that, owing to the carrying mechanism required for the spools $17^a$, there must be some space between them and hence they cannot be in longitudinal alignment with the strips or ribbons that issue from the cutting apparatus which, of course, are practically edge to edge. It is therefore necessary to bring the preformed ribbons of spools $17^a$ into longitudinal alignment with strips issuing from the cutting apparatus, or vice versa, before they can be superimposed or joined together face to face.

I prefer to deflect the preformed strips 17 to secure this alignment, as I find it desirable to effect the junction close to the point where the bias strips issue from the cutting mechanism, owing to the sticky nature of the bias stock and the difficulty of handling the same.

This is accomplished by giving the ribbons a quarter turn after leaving the roller 21 and leading them past the guide 22 (preferably in the form of rollers) carried by transverse bars 23—$23^a$ and thence past aligning pins 24 carried by bar 25, from which they are led to the bight of rolls 15 and 16, being again given a quarter turn to bring them in parallelism with the bias strips on which they are laid and to which they are joined by the coaction of rolls 15 and 16.

In order that these combined strips or ribbons may be conveniently handled, it is desirable to wind them on spools, but these spools must, to operate satisfactorily, be more widely separated than the strips or ribbons passing over roll 26 for the same reasons that require the separation of spools $17^a$, and this is accomplished by giving them a quarter turn and passing them in edgewise position between pairs of vertical guides 27 carried by bars 23—$23^a$ which are positioned to deflect the strips or align them with the winding spools.

The combined strips or ribbons are designated $17^b$ and the winding spools 28. The winding spools are removably rotatably mounted on pins $29^a$ carried by hand levers 29 fulcrumed at $29^b$ and capable of being individually swung up into the position shown in dotted lines, Fig. 1, to permit a filled spool to be readily removed and replaced by a fresh spool. Normally each spool or the outermost convolution of ribbon wound thereon rests on a positively driven roller 30 against which it is forced by the action of gravity and by which it is rotated by frictional contact with a constant surface speed. Of course, in passing from aligning guides 27 to spools 28 the ribbons 17b make another quarter turn.

The machine above described is preferably driven in the following manner.

A shaft 31 carries a pulley 32 driven by belt 33 from a power pulley 34, such for example as the drive pulley of an electric motor conventionally illustrated at 36. Shaft 31 is journaled in a pair of swinging arms or levers 35 fulcrumed at 35a and having their opposite ends connected by a link 35a with a treadle lever 37 fulcrumed at 37a. This treadle lever has a treadle member 37b at the front of the machine convenient to the foot of the operator and is normally held elevated by a spring 38 which also holds lever arms 35 elevated. Shaft 31 has fast thereon a friction pulley 39 which is located directly above and normally out of contact with a friction pulley 40 fast on drive shaft 41, which shaft is therefore normally stationary. Pressure on treadle member 37b will, however, force friction pulley 39 into contact with pulley 40 to drive the latter as long as the treadle lever is held depressed.

Drive shaft 41 carries a worm 42 which meshes with a worm wheel 43 fast on shaft 44 which in turn carries sprocket 45 which is connected by link belt 46 with sprocket 47 fast on shaft 48. Fast on the same shaft with or rigidly connected to sprocket 47 is a gear 49 which drives gear 50 fast on the shaft of the cutting roll 12 through the interposition of two rigidly connected idler gears 51 and 52, one of which (51) meshes with gear 49, while the other (52) meshes with gear 50. The offset thus secured allows gears 49 and 50 to overlap, whereby the rolls 15 and 16 of the cutting apparatus and the compression rolls can be brought nearer together.

Gear 49 is fast on the shaft of compression roll 16 and rolls 15 and 16 are caused to rotate in unison by intermeshing gears 53 and 54 fast on the respective shafts. The gearing is such that the surface speed of the compression rolls 15 and 16 is slightly greater than the speed of the cutting rolls, which produces a positive tension and minimizes the possibility of the bias stock getting out of control.

By changing the ratio of the gears connecting the cutting and compression rolls, the tension may be varied at will. This permits control of the width of the ribbon, the shrinkage of which varies with different stocks for any given tension. It also prevents any tendency of the edges of the ribbons to overlap and adhere to one another.

Rotation of spooling roller 30 is obtained by connecting a sprocket attached to it to a sprocket attached to shaft 48 by link belt, as shown.

While I have described the driving mechanism in detail in order that the machine shown in the drawings may be fully understood, it will be understood that I do not limit myself to this arrangement of operating connections, and it will also be understood that various changes may be made in the several parts of the machine without departing from the spirit of my invention.

Having thus described my invention, what I claim is:—

1. In apparatus of the class described, means for cutting a travelling sheet into a set of strips or ribbons, a plurality of spools carrying a set of preformed strips or ribbons, and means for laterally deflecting the ribbons of one set and superimposing them on the ribbons of the other set.

2. In apparatus of the class described, means for cutting a travelling sheet into a set of strips or ribbons, a plurality of spools carrying a set of preformed strips, means for deflecting the preformed strips into longitudinal alignment with said first named strips, and means for pressing the respective ribbons of said two sets of strips together.

3. In apparatus of the class described, means for cutting a travelling sheet into a set of strips or ribbons, a plurality of spools carrying a set of preformed strips, means for deflecting the preformed strips into longitudinal alignment with said first named strips, means for pressing the respective ribbons of said two sets of strips together, and means for spooling the composite strips.

4. In apparatus of the class described, means for severing a travelling sheet into strips, spaced spools for supplying preformed strips, means for deflecting said preformed strips into alignment with said first named strips, means for joining the aligned strips together face to face to produce composite strips, spaced spooling means for said composite strips, and means for deflecting said composite strips into alignment with said spooling means.

5. In apparatus of the class described, means for slitting a travelling sheet into strips, coacting pressure rolls to receive said strips, and means for feeding preformed strips to the bight of said rolls in alignment with said first named strips.

6. In apparatus of the class described, means for slitting a travelling sheet into strips, coacting pressure rolls to receive said strips, a plurality of spools for carrying preformed strips, and means for guiding said preformed strips from the spools to the bight of said rolls.

7. In apparatus of the class described, means for slitting a travelling sheet into strips, coacting pressure rolls to receive said strips, a plurality of pivoted levers, spools for preformed strips removably and rotatably carried by said levers, and means for guiding said preformed strips from said spools to the bight of said rolls.

8. In apparatus of the class described, means for slitting a travelling sheet into strips, a pair of compression rolls to receive said strips therebetween, a plurality of vertically movable spools for preformed strips, means for leading said preformed strips from said spools to the bight of said rolls in alignment with said first named strips, and means supporting said spools by frictional contact with the material wound thereon.

9. In apparatus of the class described, means for slitting a travelling sheet into strips, a pair of compression rolls to receive said strips therebetween, a plurality of vertically movable spools for preformed strips, means for leading said preformed strips from said spools to the bight of said rolls in alignment with said first named strips, and springs located beneath said spools and arranged to support the same by contact with the material wound thereon.

10. In apparatus of the class described, means for severing a travelling sheet into strips, compression rolls to receive said strips, a plurality of levers articulated on a common axis, pins carried by said levers, spools for preformed strips removably mounted on said pins, and means for guiding said preformed strips to the compression rolls in alignment with said first named strips.

11. In apparatus of the class described, means for severing a travelling sheet into strips, compression rolls to receive said strips, a plurality of levers articulated on a common axis, pins carried by said levers, spools for preformed strips removably mounted on said pins, leaf springs underlying said spools, and means for guiding said preformed strips to the compression rolls in alignment with said first named strips.

12. In apparatus of the class described, means for slitting a travelling sheet into strips, compression rolls to receive said strips therefrom, spaced spools for supplying preformed strips, means for giving said strips a quarter turn after leaving said spools to bring them into a plane perpendicular to the normal plane of the strips, and means for deflecting such strips while in edgewise position to bring them into alignment with said first named strips.

13. In apparatus of the class described, means for severing a travelling sheet into strips, coacting compression rolls to receive the same, a plurality of spaced spools for preformed strips, a horizontal guide over which all said preformed strips pass, vertical guides for turning said strips edgewise, and other vertical guides positioned to deflect such edgewise strips into line with the first named strips in said compression rolls.

14. In apparatus of the class described, a flexible sheet supply, slitting means comprising a pair of positively driven rolls and coacting cutters, a pair of closely associated positively driven compression rolls to receive the strips from said slitting rolls, and means for feeding preformed strips to said compression rolls in alignment with said first named strips.

15. In apparatus of the class described, a flexible sheet supply, slitting means comprising a pair of rolls and coacting cutters, a pair of closely associated compression rolls to receive the strips from said slitting rolls, means for driving said slitting rolls at a higher surface speed than said cutting rolls, and means for feeding preformed strips to said compression rolls in alignment with said first named strips.

In testimony whereof, I affix my signature.

JOSEPH E. PERRAULT.